United States Patent [19]
Gates

[11] Patent Number: 5,351,377
[45] Date of Patent: Oct. 4, 1994

[54] WORKSTOCK FORMING APPARATUS AND METHOD

[76] Inventor: Jerry W. Gates, 105 Napoleon, Shreveport, La. 71115

[21] Appl. No.: 145,879

[22] Filed: Oct. 28, 1993

[51] Int. Cl.$^5$ ............................................. B23Q 3/02
[52] U.S. Cl. .................................... 29/38 C; 29/563; 82/129
[58] Field of Search .................. 29/38 R, 38 C, 38 A, 29/27 A, 33 P, 563, 564; 409/158, 161; 82/124, 129, 127, 125, 126

[56] References Cited

U.S. PATENT DOCUMENTS

| | | | |
|---|---|---|---|
| 1,200,185 | 10/1916 | Gates | 29/38 C |
| 1,574,631 | 2/1926 | Mirfield | 29/38 C X |
| 1,864,897 | 6/1932 | Ewing | 29/38 C |
| 4,301,581 | 11/1981 | Bader et al. | 29/38 C |
| 4,432,130 | 2/1984 | Gabriele | 29/563 |
| 4,516,306 | 5/1985 | Albert | 29/564.7 |
| 4,557,166 | 12/1985 | Jauch | 29/38 C X |
| 4,655,652 | 4/1987 | Schissler | 409/132 |
| 4,949,444 | 8/1990 | Kojima et al. | 29/27 R |
| 5,042,125 | 8/1991 | Harwood et al. | 29/33 |

FOREIGN PATENT DOCUMENTS

| | | | |
|---|---|---|---|
| 936176 | 12/1955 | Fed. Rep. of Germany | 29/38 A |
| 186501 | 10/1983 | Japan | 82/129 |
| 172401 | 9/1985 | Japan | 82/129 |
| 5057506 | 3/1993 | Japan | 82/126 |
| 382500 | 5/1973 | U.S.S.R. | 29/38 C |
| 1324766 | 7/1987 | U.S.S.R. | 29/38 R |

*Primary Examiner*—William Briggs
*Attorney, Agent, or Firm*—John M. Harrison

[57] ABSTRACT

A workstock forming apparatus and method for forming both ends of workstock blanks without the necessity of reversing the ends of the workstock blanks. The apparatus and method include a loading servo or cylinder for successively loading individual workstock blanks such as pipe nipple blanks onto a turntable which initially receives and positions a first nipple blank to be threaded on one end by a first threading spindle. The turntable then sequentially rotates back into alignment with the loading cylinder and successively receives additional nipple blanks, which are rotated in sequence with the turntable and first nipple blank for threading on one end by the first threading spindle, while the first and succeeding nipple blanks are sequentially linearly displaced in a guide on the turntable and the unthreaded ends of the first and succeeding nipple blanks are simultaneously threaded by a second threading spindle. The rotating turntable operates to sequentially deposit the dually threaded nipples in a hopper or at an inspection station as each succeeding nipple blank is received from the loading cylinder. The loading cylinder, turntable and threading spindles may be operated and controlled by a programmable controller and a computer.

18 Claims, 2 Drawing Sheets

WORKSTOCK FORMING APPARATUS AND METHOD

BACKGROUND OF THE INVENTION

1. Field of the Invention

This invention relates to workstock forming devices such as pipe nipple threading apparatuses and a method of sequentially forming the ends of workstock blanks without reversing the blanks. Typically, the circumferential exterior of both ends of multiple pipe nipple blanks can be threaded using an indexible turntable. In a preferred embodiment the apparatus and method of this invention includes a loading servo or cylinder which linearly contacts multiple workstock such as pipe nipple blanks and successively loads individual blanks onto a rotatable, indexible turntable. The turntable is designed to rotate and index at a specified angle, typically 45 degrees, and carries a pair of clamps or vises at opposite peripheral edges, a first one of which vises initially receives a first blank, the turntable then rotates and aligns the first blank with a first forming spindle, such as a threading spindle, which extends a head to engage and form or thread the exterior circumference of one end of the first blank as it is gripped by the vise. The turntable subsequently rotates back into alignment with the loading servo or cylinder, receives a second blank from the loading cylinder and rotates to align the second blank with the first spindle, which forms or threads one end of the second blank as it is seated in the first vise. Simultaneously, the first blank is forced by the second blank into a guide tube lying across a diameter of the turntable and extending between the vises and the turntable continues to rotate and ultimately align the unformed ends of the first and subsequent blanks with a second forming spindle, which similarly forms or threads the unthreaded ends of these blanks. The first and succeeding blanks, formed or threaded at each end, are then individually displaced from the guide tube and deposited in a hopper or at an inspection station and the cycle is repeated. The components of the workstock forming apparatus, typified herein by a pipe nipple threading device, may be sequentially activated and controlled by a programmable controller, either manually, or automatically, by a pre-programmed computer.

2. Description of the Prior Art

Various automated devices for forming, machining or threading items such as pipes, are known in the art. U.S. Pat. No. 4,301,581, dated Nov. 24, 1981, to Eugen Bader and Kurt Jauch, discloses a "Method and Apparatus for the Production of Turned Workpieces on Multi-Station Machine Tools". A rod stock is clamped by a clamping device on the machine. A rod section is then severed at a distance from the clamping device corresponding to a multiple of the machining length, and the free end protruding from the clamping device is turned, providing machining access to the entire surface of the rod section. U.S. Pat. No. 4,432,130, dated Feb. 21, 1984, to Leonard A. Gabriele, describes a "Six Station Broaching Machine", for sequentially machining multiple, parallel surfaces on workpieces. The workpieces are locked in position on an index table and the surfaces machined in one operation are angularly positioned with respect to the surfaces machined in a contiguous operation by revolving the workpieces about the axis of the table. U.S. Pat. No. 4,516,306, dated May 14, 1985, to Robert J. Albert, details a "Semi-Automatic Pipe-Threading Plant and Apparatus Therefor", including a lifting device for raising an unthreaded pipe to a height proper for a threading machine to form threads on each end of the pipe. A particular sequencing of equipment actuation and movement is utilized to facilitate loading of unthreaded pipe on the lifting device and unloading of threaded pipe, without requiring manual handling of the pipe. U.S. Pat. No. 4,655,652, dated Apr. 7, 1987, to Brian D. Schissler, describes a "Method of Multiple-Station Drilling" for performing a large number of repetitive, but variable machining operations. A turntable having multiple workpiece-holding fixtures distributed in spaced relationship around its periphery, includes multiple tool supports mounted around and outward of the periphery to provide a sequence of machining stations. A load/unload station is provided for reversably mounting workpieces on the fixtures and a motor is included for driving the turntable in an indexing fashion to bring workpieces held in the fixtures successively into registry with the machining stations. U.S. Pat. No. 5,042,125, dated Aug. 27, 1991, to Jon W. Harwood et al, details an "Apparatus for Manufacturing Stamp-Formed Mufflers". A muffler is assembled on an indexible fixturing apparatus having multiple stations for receiving the formed components of the muffler. A robotic gripping apparatus is provided in proximity to the indexible fixturing apparatus for moving aligned components of the muffler to welders and the aligned components are welded to one another while the pipes for the exhaust system are bent into their required configuration by programmable pipe benders. The assembled muffler and bent pipes are then delivered to a second indexible fixturing apparatus, on which programmable welders connect the exhaust system components together. U.S. Pat. No. 5,150,496, dated Sep. 29, 1992, to Scott Bromley, describes an "Internal Grinding and Cutting Device for Pipe and Casing" for reworking the interior diameter of oil field pipe and casing, and especially plastic-coated pipe that is to be re-coated. The device is characterized by a grinderhead with a cutterhead assembly, including a mandrel which turns a special cutting device having multiple grinders for engaging and cutting the inner wall of the pipe as the cutterhead assembly is forced to travel through the pipe. Alignment and grinding members are attached to the mandrel for maintaining proper alignment of the cutterhead assembly in the pipe.

One of the problems inherent in conventional workstock forming devices such as pipe nipple threading apparatuses and methods is the substantial amount of floor space required for the equipment. Additionally, the process of forming or threading multiple pipe nipple blanks on both ends can be extremely labor-intensive and slow, since the technique usually involves reversing the ends of the blanks. Accordingly, it is an object of this invention to provide an efficient, space-saving, automated method and apparatus for successively forming the ends of workstock, such as threading the exterior circumference of both ends of multiple pipe nipple blanks, without reversing the blanks.

It is a further object of the invention to provide a method and apparatus for threading and inspecting the exterior circumference of both ends of workstock such as pipe nipple blanks, which apparatus is characterized by computer-controlled, sequentially-activated components, including a loading cylinder for handling pipe nipple blanks, an indexible turntable fitted with a pair of clamping devices such as vises, connected by a guide slot or tube for receiving and stabilizing the blanks and a pair of threading spindles for threading the blanks at each end without the necessity of reversing the blanks in the handling apparatus. The forming or threading method includes successively loading individual unthreaded pipe nipple blanks onto the first vise on the indexed turntable by operation of the loading servo or cylinder, which turntable then rotates approximately 45 degrees and positions one end of the blank to be exteriorly engaged and threaded by a first threading spindle. The turntable then rotates back into loading configuration and receives a second nipple blank, which is similarly positioned and threaded, while simultaneously linearly forcing the first nipple blank into a guide slot or tube positioned across a diameter of the turntable. Sequential loading and threading of additional blanks causes the unthreaded ends of the first and successive nipple blanks to progress in the guide tube and align in sequence with a second vise and a threading spindle, the latter of which sequentially threads the unthreaded ends of the first and successive nipple blanks. The turntable again rotates, loads additional blanks and displaces the first and successive completely threaded nipples to a hopper or an inspection station, and the cycle repeats. The threading cycle may be controlled by a programmable controller for receiving data, either manually or from a computer.

SUMMARY OF THE INVENTION

These and other objects of the invention are provided in an automated workstock forming device which, for purposes of illustration herein, includes a pipe nipple threading apparatus and method for sequentially threading the ends of multiple pipe nipple blanks, which apparatus is characterized by an assembly of equipment including a loading servo or cylinder for sequentially loading pipe nipple blanks into a first one of two vises mounted on opposite peripheral edges of an indexible turntable having a guide tube extending across a diameter of the turntable between the vises, for stabilizing pipe nipples on the turntable in end-to-end relationship. A pair of opposed, aligned threading spindles are provided for threading each end of the pipe nipples, respectively. The method of this invention includes the steps of successively loading individual pipe nipple blanks onto the turntable and into the first vise and guide tube by operation of the loading servo or cylinder; rotating the turntable to position one end of a first nipple blank seated in the first vise in alignment with a first threading spindle piston and engaging device slidably extended from a first threading spindle to thread one end of the blank; rotating the turntable in the opposite direction to receive a second nipple blank from the loading cylinder and linearly force the first, partially threaded nipple blank into the guide tube; again rotating the turntable to position one end of the second nipple blank in alignment with the first threading spindle to thread one end of the second blank; and sequentially rotating the turntable and loading and threading additional blanks to finally position the unthreaded ends of the first and successive partially threaded nipple blanks in the second vise in alignment with a second threading device extended from a second threading spindle, to thread the opposite ends of the first and successive nipple blanks; then rotating the turntable again to simultaneously deposit the dually threaded first and successive nipple blanks at an inspection station or in a hopper and receive yet another unthreaded nipple blank from the loading cylinder, as the cycle continues.

DESCRIPTION OF THE PREFERRED EMBODIMENTS

Figure 1:
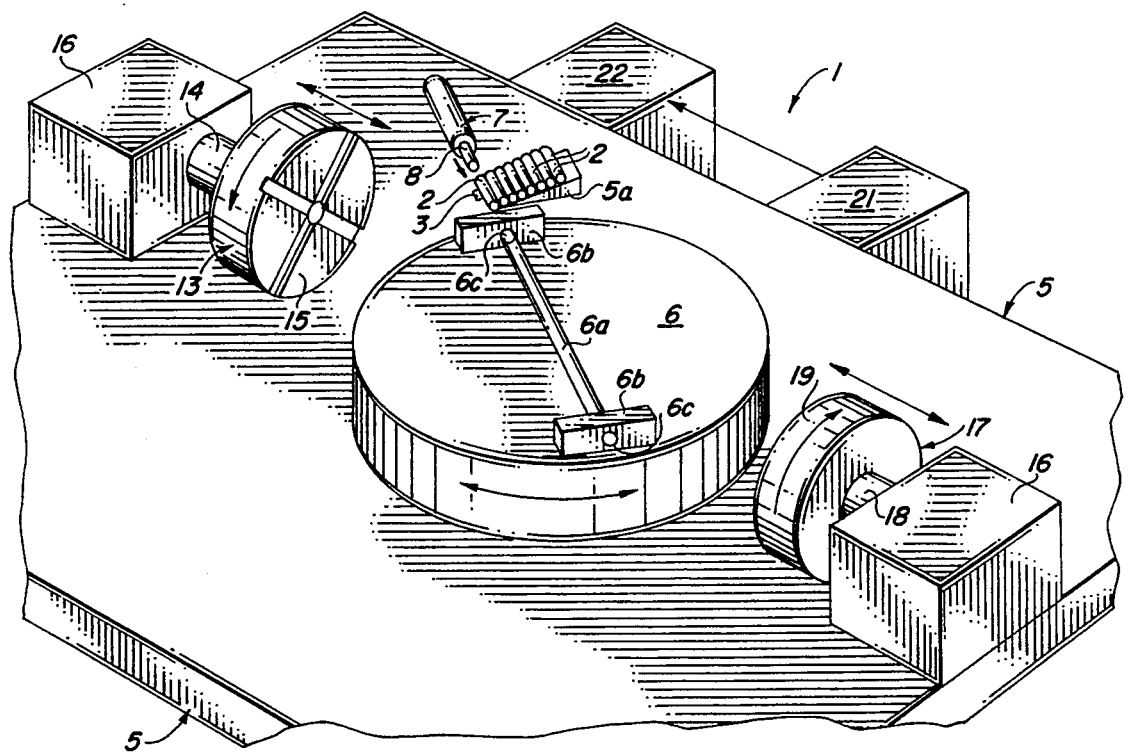
FIG. 1 is a perspective view of an apparatus for threading the exterior circumference of both ends of multiple, successive pipe nipple blanks, which apparatus is disposed in blank-loading configuration.
Figure 2A:
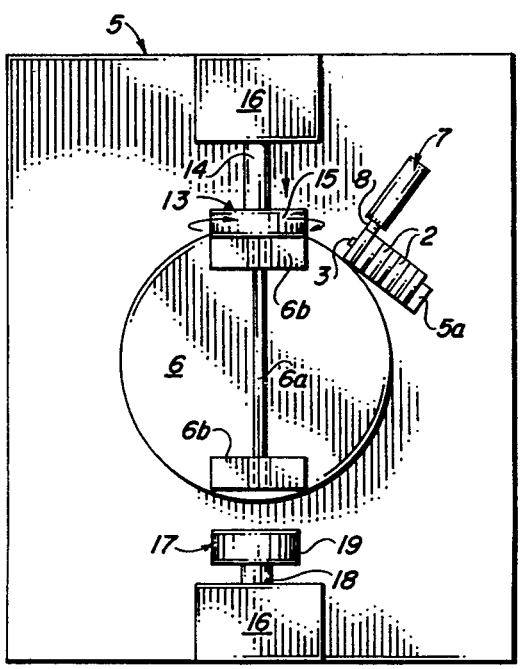
FIG. 2A is a top view of the apparatus illustrated in FIG. 1, in single threading configuration.
Figure 2B:
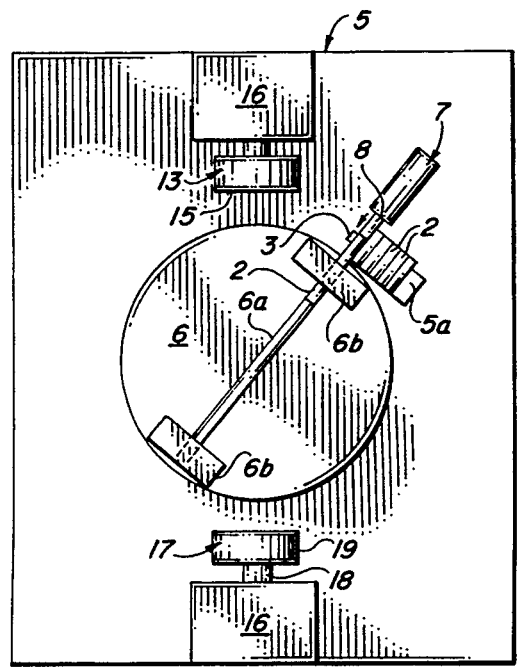
FIG. 2B is a top view of the apparatus illustrated in FIG. 1, again in blank-loading configuration, with the top of the guide tube removed.
Figure 2C:
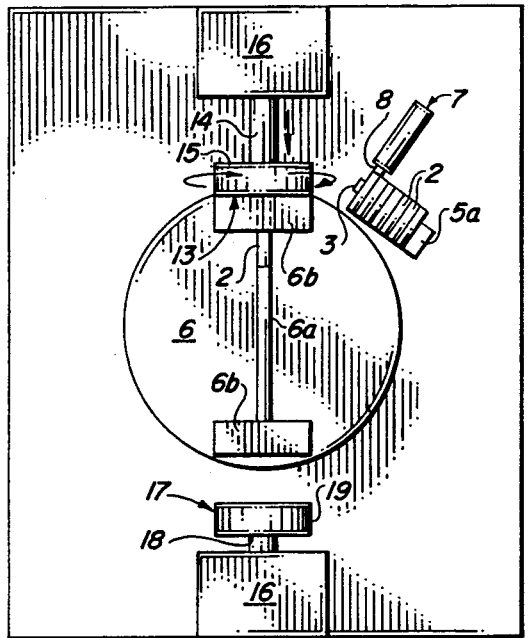
FIG. 2C is a top view of the apparatus illustrated in FIG. 1, in single threading configuration, with the top of the guide tube removed.
Figure 2E:
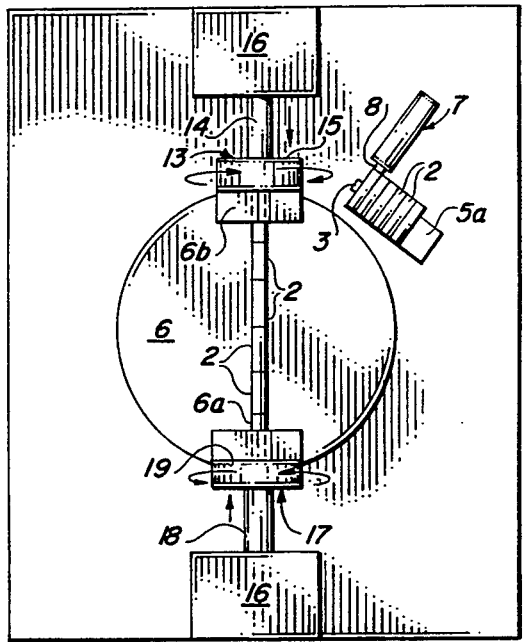
FIG. 2E is a top view of the apparatus illustrated in FIG. 1, in dual threading configuration, with the top of the guide tube removed.
Figure 2D:
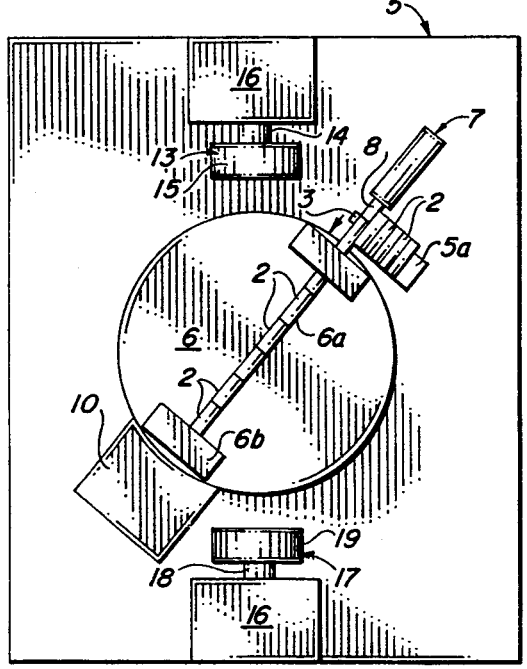
FIG. 2D is a top view of the apparatus illustrated in FIG. 1 in blank-loading and guide tube loading configuration, with the top of the guide tube removed.
Figure 3:
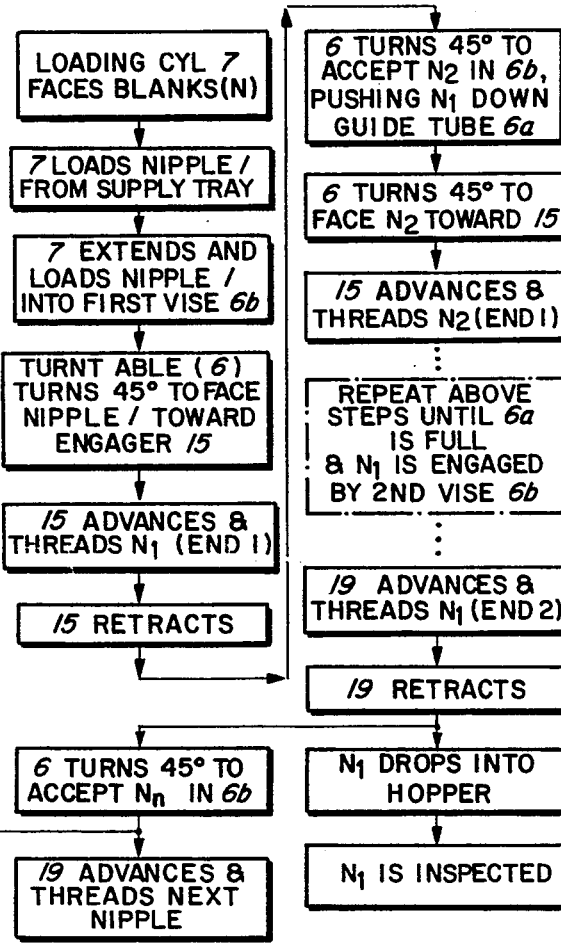
FIG. 3 is a representation of the steps for implementing the workstock forming apparatus of this invention.

The apparatus for carrying out the method of the subject invention as embodied in FIG. 3 is illustrated in FIGS. 1 and 2. Referring initially to FIG. 1, the workstock forming device of this invention, typified by a pipe nipple threading apparatus, is generally illustrated by reference numeral 1. A loading cylinder 7, the longitudinal axis of which is disposed radially with respect to a circular, indexible turntable 6, is mounted along with the turntable 6 on a support 5 and is characterized by a slidably-extendable loading cylinder servo or piston 8. The loading cylinder piston 8 successively linearly aligns with multiple, tubular, gravity-fed pipe nipple blanks 2, stacked on a wedge-shaped pallet 5a and restrained in such alignment with the loading cylinder piston 8 by a blank stop 3. A first threading spindle 13, also disposed radially with respect to the turntable 6, is positioned counterclockwise about the turntable 6 with respect to the loading cylinder 7 and includes a spindle drive 16 which receives a slidably-extendable first threading spindle piston 14, provided with a first threading spindle device 15 on the end thereof. A second threading spindle 17, including a spindle drive 16 that mounts a slidably-extendable second threading spindle piston 18, provided with a second threading spindle device 19 on the end thereof, is also disposed radially with respect to the turntable 6 in opposed alignment with the first threading spindle 13 and is situated 180 degrees about the turntable 6 with respect to the first threading spindle 13. A pair of threading clamps or vises 6b, each having a vise opening 6c, are mounted on opposite peripheral edge locations on the turntable 6 and a guide tube 6a is disposed between the vises 6b and communicates with the vise openings 6c, to slidably accommodate the nipple blanks 2 in end-to-end relationship, as hereinafter described. An inspection station or hopper 10, illustrated in FIG. 2D, may be positioned adjacent to the turntable 6 below the second threading vise 6b, for receiving dually threaded nipples 2 from the second threading vise 6b. A programmable controller 22, selectively operated by a computer 21, sequentially actuates the above-described components of the pipe nipple threading apparatus 1 according to programming and wiring (not illustrated) connecting the programmable controller 22 to the respective components of the workstock forming apparatus 1. The workstop forming apparatus 1 of this invention operates to thread the exterior circumference of both ends of successive, multiple pipe nipple blanks, in the following manner and sequence:

Referring initially to FIGS. 1, 2A and 2B of the drawings, unthreaded pipe nipple blanks 2 are placed on the wedge-shaped pallet 5a adjacent to the loading cylinder 7. The loading cylinder piston 8 linearly engages the first nipple blank 2, which is aligned therewith by operation of gravity and the blank stop 3. The loading cylinder piston 8 then extends the first nipple blank 2 into the vise opening 6c of the threading vise 6b on the turntable 6 and the first nipple blank 2 is loaded and secured on the turntable 6.

Referring next to FIGS. 2A and 2B of the drawings, the turntable 6 rotates by operation of suitable mechanical means (not illustrated) approximately 45 degrees counterclockwise on the support 5, as illustrated in FIG. 2A, aligning the first nipple blank 2 with the first threading spindle 13. The first threading spindle piston 14 then extends and the first threading spindle device 15 engages and threads the exterior circumference of the end of the first nipple blank 2 extending outwardly from the threading vise 6b on the turntable 6. The loading cylinder piston 8 then retracts and linearly engages the second nipple blank 2 and the third and successive nipple blanks 2 are next in position to enter the loading cylinder 7, as illustrated in FIG. 2B.

Referring now to FIGS. 2C–2E, the first threading spindle device 15 disengages the newly-threaded end of the first nipple blank 2 and retracts. The turntable 6 then rotates approximately 45 degrees clockwise, aligning the partially threaded first nipple blank 2 with the second nipple blank 2, which is engaged by the loading cylinder piston 8. The loading cylinder piston 8 of the loading cylinder 7 then extends and loads the second nipple blank 2 into threading position in the first threading vise 6b of the turntable 6. This action forces the first nipple blank 2 from the vise opening 6c of the first threading vise 6b into the guide tube 6a, toward the second threading vise 6b. The loading cylinder piston 8 then disengages the second nipple blank 2, retracts, and the turntable 6 then rotates approximately 45 degrees counterclockwise, aligning the second nipple blank 2 with the first threading spindle 13. Simultaneously, the turntable 6 aligns the guide tube 6a and the first nipple blank 2 enclosed therein, with the second threading spindle 17. After several operating sequences during which the guide tube 6a is filled with nipple blanks 2 that are threaded on one end, the first threading spindle piston 14 extends and the first threading spindle device 15 threads the outwardly-facing, unthreaded end of the extending nipple blank 2, while the second threading spindle piston 18 extends and the second threading spindle device 19 threads the unthreaded end of the first nipple blank 2, which now projects from the opposite threading vise 6b. The first threading spindle device 15 disengages the newly-threaded end of the projecting nipple blank 2 and retracts, while the second threading spindle device 19 disengages the newly-threaded second end of the first nipple blank 2 and also retracts. The turntable 6 then rotates approximately 45 degrees clockwise and deposits the double-threaded first nipple blank 2 in a hopper 10, illustrated in FIG. 2D, or at an inspection station (not illustrated).

Accordingly, referring again to the drawings and FIG. 3 in particular, the loading cylinder piston 8 of the loading cylinder 7 continues to load nipple blanks 2 in sequence into the first of the two threading vises 6b and then retracts as the turntable 6 rotates about 45 degrees counterclockwise. The first threading spindle piston 14 then extends the first threading spindle device 15 to thread the end of the nipple blank 4 facing outwardly from the threading vise 6b on the turntable 6. Similarly, when the guide tube 6a is filled with nipple blanks 2, the second threading spindle piston 18 extends the second threading spindle piston device 19 to thread the unthreaded end of another nipple blank 2 seated in the second threading vise 6b, which nipple blank 2 has been displaced from the guide tube 6a. The double-threaded nipple blank 2 is then deposited in the hopper 10 or at an inspection station as described above, and the cycle repeats.

As further illustrated in the drawings, the respective components of the pipe nipple threading apparatus 1, including the indexible turntable 6, can be electrically and electronically connected to the programmable controller 22 for manual orchestration of the system components, according to the knowledge of those skilled in the art. Consequently, an operator can operate the programmable controller 22 to control the loading cylinder 7, turntable 6 and the threading vises 6b, as well as the first threading spindle 13 and second threading spindle 17. Alternatively, the computer 21 can be electronically interfaced with the programmable controller 22 according to the knowledge of those skilled in the art to automatically feed pre-programmed data into the programmable controller 22, as desired.

Although the invention has been detailed herein for purposes of illustration as a device for threading both ends of pipe nipple blanks, it will be appreciated that the apparatus can be adapted to form the ends of any workstock that can be loaded onto the turntable, presented to the first spindle, slidably forced into a guide tube, groove or slot of suitable size and shape and presented in sequence to the opposite spindle to form the opposite end. Accordingly, the ends of various workstock can be machined, milled, bored, cut, slotted and otherwise shaped, as well as threaded in the manner described above, without the necessity of reversing the workstock. Furthermore, the guide tube 6a can be connected to the respective threading vises 6b and the entire unit replaced by a second set of threading vises 6b having vise openings 6c and a guide tube 6a of selected size and shape to accommodate a workstock of corresponding size and shape.

While the invention has been described with the specificity set forth above, it will be recognized that various changes can be made without departing from the spirit and scope of the invention.

Accordingly, what is claimed is:

1. A workstock forming apparatus for forming the ends of workstock, comprising:
   (a) loading means operable for engaging the workstock;
   (b) turntable means disposed in spaced relationship with respect to said loading means for receiving the workstock in sequence from said loading means and rotating the workstock a preselected distance;
   (c) guide means disposed on said turntable means in alignment with the workstock for guiding the workstock from one side of said turntable means to the opposite side of said turntable means;

(d) first workstock forming means disposed in spaced relationship with respect to said cylinder means and said turntable means and operable for sequentially working one end of the workstock when the workstock is sequentially rotated by said turntable means into alignment with said first workstock forming means; and (e) second workstock forming means disposed in spaced, substantially aligned relationship with respect to said first workstock forming means for sequentially working the opposite end of the workstock when the workstock is sequentially rotated by said turntable means into alignment with said first workstock forming means and said second workstock forming means.

2. The workstock forming apparatus of claim 1 comprising hopper means disposed in spaced relationship with respect to said turntable means for receiving and inspecting the workstock when said one end and said opposite end of the workstock have been formed by said first workstop forming means and said second workstock forming means, respectively.

3. The workstock forming apparatus of claim 1 comprising programmable controller means electrically connected to said loading means, said turntable means, said first workstock forming means and said second workstock forming means for operating said loading means, said turntable means, said first workstock forming means and said second workstock forming means.

4. The workstop forming apparatus of claim 3 comprising computer means electrically connected to said programmable controller means for automatically operating said programmable controller means.

5. The workstock forming apparatus of claim 1 comprising a pair of vise means carried by said turntable means and communicating with said guide means, for releasably gripping the workstock while the workstock is engaged by said first workstock forming means and said second workstock forming means.

6. The workstock forming apparatus of claim 5 comprising programmable controller means electrically connected to said loading means, said turntable means, said first workstock forming means and said second workstock forming means for operating said loading means, said turntable means, said first workstock forming means and said second workstock forming means.

7. The workstock forming apparatus of claim 6 comprising computer means electrically connected to said programmable controller means for automatically operating said programmable controller means.

8. A pipe nipple threading apparatus for continuously threading pipe nipples, comprising:

(a) loading means having a loading piston operable for sequentially engaging the pipe nipples;

(b) indexible turntable means disposed in spaced relationship with respect to said loading means for receiving the pipe nipples in sequence from said loading means and rotating the pipe nipples a preselected indexed distance;

(c) a first threading spindle disposed in spaced relationship with respect to said loading means and said indexible turntable means and operable for threading one end of each of the pipe nipples when the pipe nipples are sequentially rotated by said turntable means into alignment with said first threading spindle;

(d) guide means disposed across a diameter of said indexible turntable means for guiding the pipe nipples from said first threading spindle across said indexible turntable means; and (e) a second threading spindle disposed across said indexible turntable means opposite and aligned with said first threading spindle, for sequentially threading the opposite end of each of the pipe nipples when the pipe nipples are sequentially forced through said guide means responsive to loading of additional pipe nipples on said indexible turntable means and said indexible turntable means is rotated into alignment with said first threading spindle and said second threading spindle.

9. The pipe nipple of claim 8 comprising computerized control system means electrically connected to said loading means, said indexible turntable means, said first threading spindle and said second threading spindle, for automatically operating said loading means, said indexible turntable means, said first threading spindle and said second threading spindle.

10. The pipe nipple threading apparatus of claim 8 comprising a pair of vise means carried by opposite areas of said indexible turntable means and communicating with said guide means, for releasably gripping the pipe nipples while the pipe nipples are engaged by said first threading spindle and said second threading spindle.

11. The pipe nipple threading apparatus of claim 10 comprising computerized control system means electrically connected to said loading means, said indexible turntable means, said first threading spindle and said second threading spindle, for automatically operating said loading means, said indexible turntable means, said first threading spindle and said second threading spindle.

12. The pipe nipple threading apparatus of claim 11 wherein said computerized control system means comprises a programmable controller and a computer.

13. A method of threading both ends of pipe nipples, comprising the steps of:

(a) locating said pipe nipples in loading configuration with respect to a loading means;

(b) operating said loading means to load a first one of said pipe nipples on a rotatable, indexible turntable having a guide tube for receiving said pipe nipples in linear orientation;

(c) rotating said indexible turntable to align said first one of said pipe nipples with a first pipe threading apparatus and engaging said first one of said pipe nipples with said first pipe threading apparatus for threading one end of said first one of said pipe nipples;

(d) rotating said first one of said pipe nipples back into alignment with said loading means and loading a second one of said pipe nipples on said rotatable, indexible turntable and displacing said first one of said pipe nipples in the guide tube with said second one of said pipe nipples, said first one of said pipe nipples and said second one of said pipe nipples disposed on said turntable in slidably linearly aligned relationship with respect to each other;

(e) rotating said indexible turntable to align said second one of said pipe nipples with said first pipe threading apparatus;

(f) engaging said second one of said pipe nipples with said first pipe threading apparatus for threading one end of said second one of said pipe nipples;

(g) sequentially rotating said indexible turntable to alternately load additional pipe nipples one-by-one on said indexible turntable and operating said first pipe threading apparatus to thread one end of said pipe nipples in sequence; and (h) engaging the opposite ends of said pipe nipples with said second pipe threading apparatus for threading the opposite ends of said pipe nipples, responsive to slidable displacement of said pipe nipples in said guide tube.

14. The method according to claim 13 comprising the step of electrically connecting a programmable controller to said loading means, said indexible turntable, said first pipe threading apparatus and said second pipe threading apparatus, for automatically operating said loading means, said indexible turntable, said first pipe threading apparatus and said second pipe threading apparatus.

15. The method according to claim 14 comprising the step of electrically connecting a computer to said programmable controller for automatically operating said programmable controller.

16. The method according to claim 13 comprising the step of providing a collection hopper in spaced relationship with respect to said indexible turntable and delivering threaded ones of said pipe nipples to said collection hopper.

17. The method according to claim 16 comprising the step of electrically connecting a programmable controller to said loading means, said indexible turntable, said first pipe threading apparatus and said second pipe threading apparatus, for automatically operating said loading means, said indexible turntable, said first pipe threading apparatus and said second pipe threading apparatus.

18. The method according to claim 17 comprising the step of electrically connecting a computer to said programmable controller for automatically operating said programmable controller.

* * * * *